United States Patent [19]

Bachelard et al.

[11] Patent Number: 4,871,479

[45] Date of Patent: Oct. 3, 1989

[54] PROCESS FOR PRODUCING SINTERED MIXED OXIDES WHICH ARE SOLUBLE IN NITRIC ACID FROM SOLUTIONS OF NITRATES

[75] Inventors: Roland Bachelard, Lyons; Patrick Germanaz, Aix En Provence, both of France

[73] Assignee: Comurhex Societe Pour La Conversion De L'Uranium En Metal Et Hexafluorure, Courbevoie, France

[21] Appl. No.: 211,160

[22] Filed: Jun. 22, 1988

Related U.S. Application Data

[63] Continuation of Ser. No. 26,687, Mar. 17, 1987, abandoned.

[30] Foreign Application Priority Data

Mar. 25, 1986 [FR] France .................. 86 04631

[51] Int. Cl.$^4$ .................. C01G 43/01; C01G 43/025; C09K 11/04
[52] U.S. Cl. .................. 252/636; 252/643; 252/638; 264/0.5
[58] Field of Search .................. 252/643, 636, 638; 264/0.5

[56] References Cited

U.S. PATENT DOCUMENTS

| | | | |
|---|---|---|---|
| 3,804,772 | 4/1974 | Lane et al. | 252/643 |
| 4,247,495 | 1/1981 | Ennerst et al. | 252/643 |
| 4,333,912 | 6/1982 | Mills, et al. | 423/18 |
| 4,364,859 | 12/1982 | Ohtsuka et al. | 252/643 |
| 4,397,778 | 8/1983 | Lloyd | 252/643 |
| 4,409,157 | 10/1983 | Haas et al. | 252/643 |
| 4,439,402 | 3/1984 | Terutani et al. | 252/643 |
| 4,578,229 | 3/1986 | Assmann et al. | 252/643 |
| 4,585,634 | 4/1986 | Bachelard et al. | 423/260 |
| 4,671,904 | 6/1987 | Dörr et al. | 252/643 |
| 4,676,953 | 6/1987 | Funke et al. | 252/643 |
| 4,687,601 | 8/1987 | Bachelard et al. | 252/643 |

*Primary Examiner*—Edward A. Miller
*Attorney, Agent, or Firm*—Dennison, Meserole, Pollack & Scheiner

[57] ABSTRACT

A process is disclosed for producing sintered mixed metal oxide nuclear fuel pellets containing $UO_2$ and the oxide of at least one other fissionable or rare earth element M, the pellets being directly soluble in nitric acid without nitric acid additive or prior treatment of the pellets. The process comprises the steps of mixing together nitrate solutions of the elements, concentrating the mixture of solutions, thermally denitrating the concentrated nitrate mixture without additives, to obtain an intermediate mixed oxide powder, calcining the intermediate mixed oxide powder, reducing the calcined mixture, stabilizing the uranium oxide $UO_2$ in the reduced oxide mixture, shaping and pressing the resulting stabilized, reduced oxide mixture to obtain pellets of green material, sintering the pellets of green material and grinding the sintered pellets. The intermediate steps of this process produce mixed oxide powders of high flowability and good sinterability without the necessity of crushing which tends to produce troublesome effluent or dangerous aerosols of solids.

16 Claims, No Drawings

PROCESS FOR PRODUCING SINTERED MIXED OXIDES WHICH ARE SOLUBLE IN NITRIC ACID FROM SOLUTIONS OF NITRATES

This is a continuation of co-pending application Ser. No. 026,687 filed on Mar. 17, 1987, now abandoned.

TECHNICAL FIELD

The present invention describes a process for the manufacture of sintered mixed oxides, mainly for use as nuclear fuel, which are completely soluble in nitric acid alone. They are obtained starting with solutions of nitrates of the constituent elements.

The process is preferably applied to mixtures involving two or more elements which can take part in the composition of a nuclear fuel, for example U, Pu, Th, and other fissile or fertile elements, but also their combination with rare earth metals such as cerium or gadolinium. In this latter case, the process relates to the manufacture of control rods based on mixed sintered oxides, for example uranium/gadolinium.

The process can also be applied to uranium alone.

The material of the constituent elements of the mixtures can be of different origins: it may or may not have undergone irradiation, and may have any isotopic composition. In particular, uranium can be natural or enriched uranium, non-irradiated or derived from plants for reprocessing irradiated fuel after cooling and separation of the Pu and the fission products.

PRIOR ART

The processess for manufacture of fuels in the form of oxides are well known, both those for making fuels containing uranium alone and those for mixed fuels containing mixtures in variable proportions of two or more elements such as U, Pu, Th, etc.

Mixed fuels, for example U+Pu, can be made either from a mixture of powders ($UO_2$ and $PuO_2$) or from solutions of nitrates of each of the components.

They generally take the form of pellets, the term which will be used hereinafter and which will also denote any other geometrical form capable of being used for the production of fuel elements.

1. Starting with a mixture of powders, the main operations are as follows:
crushing the powders,
mixing the powders,
shaping and pressing the pellets,
high-temperature sintering,
grinding the pellets to bring them to size and examination of the texture.

The manufacturing scrap is recycled, according to the type of defect, to the sintering, to the crushing or further upstream for storage or possible redissolution.

2. Starting with solutions of nitrates, the main operations are:
mixing the solutions of the components of the fuel,
concentration of the solution obtained,
production of a mixed oxide in an appropriate physical form, uranium at this stage being at valency VI and Pu at valency IV,
where appropriate, calcining to obtain $U_3O_8$,
reduction to obtain uranium IV,
stabilization of the uranium IV,
and then, as above:
shaping and pressing the pellets,
sintering,
grinding.

In this case also the oxides or pellets which do not conform to the specification, are recycled, after possible crushing, to calcining, to reduction, to the sintering or further upstream, in order to obtain a starting nitrate solution, after a dissolving operation followed, where appropriate, by a purification operation.

For the operation of production of a mixed oxide, several processes are known:

the uranium and plutonium are coprecipitated using ammonia, the precipitates is separated from the mother liquor containing dissolved ammonium nitrate, and this coprecipitate is dried and then calcined to obtain a mixed oxide in the form of grains, the particle size of which can be more or less readily adjusted using suitable precipitation devices known in other contexts;

the uranium and plutonium are coprecipitated using ammonia by a sol-gel process so as to obtain, after decantation, drying and calcining, microspheres of mixed oxides (see, for example, U.S. Pat. No. 4,397,778, French Pat. No. 2,501,061 or French Pat. No. 2,386,104).

In both of these possible techniques, there is generation of a radioactive effluent mainly containing ammonium nitrate and contaminated with heavy metals and radioactivity; it has to be processed before disposal or upgrading.

denitration is performed in the presence of an aid, enabling an intermediate oxide to be obtained having a large specific surface area, which is then suitable for the pressing and sintering of the fuel pellets. Such a process is described in French Pat. No. 2,498,364, in which the value of denitration is, in fact, noted although the latter is performed with the addition of ammonium nitrate. Denitration performed without an aid, as described in French Pat. No. 2,496,324, leads to an oxide which has to be crushed in order that it may be sintered.

When the grinding is complete, the shaped fuel material is obtained ready for use for producing finally the fuel assemblies introduced into nuclear boilers of the PWR, BWR, fast neutron or other type. After irradiation, cooling and dismantling of the assemblies, the irradiated fuel material is extracted from the assemblies and dissolved so as to be able to separate chemically the unburned uranium, the plutonium and the fission products. This dissolving process is difficult, because $PuO_2$ is only slightly soluble in pure nitric acid; this dissolution is achieved only in the heated state in the presence of hydrofluoric acid, and this causes problems in relation to the corrosion resistance of the reactors and other equipment. For $PuO_2$ to be soluble in pure nitric acid, $UO_2$ and $PuO_2$ have to be in solid solution, it being possible for this solid solution to be obtained during sintering provided that there is a very homogeneous distribution of $PuO_2$ in $UO_2$ and very intimate contact between these two species before sintering. This can be achieved if the starting powders are very finely divided (15 to 20 $\mu$m) or if the procedure employs coprecipitation or denitration.

TECHNICAL PROBLEM

The main difficulties to be solved, or the advances which the experts are currently seeking to achieve, relate to the simplification of these processes, which employ products which are highly radioactive or dangerous such as plutonium. In this field, the simplifications result in considerable gains as regards the safety of the personnel or the environment, and in installation and operating costs.

A first series of problems arises from the handling of the powders.

At present, available Pu is mainly in the form of $PuO_2$ powder and, in order that it may be used in mixed fuels, this requires expensive fine crushing in order to be able to obtain very good homogeneity of distribution of the Pu in the powder mixture. For example, in a pellet, not more than 5% of the $PuO_2$ present must be in particles of diameter greater than 200 $\mu$m.

Crushing of this kind, and similarly the mixing of the powders, cause cost and health problems on account of the formation of aerosols which are difficult to neutralize. These problems arise whenever certain operations are performed on the oxides or powders, such as:

crushing of the cooled irradiated fuel, prior to dissolving it in nitric acid in the presence of hydrofluoric acid for reprocessing of the fuel, the problems being heightened in this case by the presence of fission products;

crushing during recycling of the fuel pellets which do not conform to the specifications, either to produce a powder, shaped again by pressing and sintered, or to make the product soluble;

in the process starting with nitrate solutions, crushing designed to achieve very good flowability of the oxide powder obtained after the coprecipitation and calcining.

A second problem arises from the fact $PuO_2$ is only soluble in nitric acid in the presence of hydrofluoric acid.

In particular, with the mixed fuels obtained from powders, this dissolution can, as has just been seen, be achieved only after crushing of the pellets. This greatly complicates the operations of reprocessing the fuel, or recycling the waste, and there is consequently an advantage to be gained from producing pastilles which are directly soluble in nitric acid alone. The use of hydrofluoric acid is expensive, requires appropriate additional equipment and causes a number of operating problems; for example, in French Pat. No. 2,480,019, a process is described for removing the fluoride ions thereby introduced.

The dissolution of the mixed fuels must, moreover, be complete.

A third problem arises, in the process starting with nitrate solutions, from the presence of a liquid effluent generated by the coprecipitating alone or via a sol-gel process. The processing and the disposal of this radioactive effluent must be regarded as forming an integral part of the process. In effect, in the nuclear sector, any cycle for treatment of effluent must be closed and not give rise to any waste.

These problems have to be solved while retaining the intrinsic qualities of the intermediate products obtained during the production of the fuel. In particular, the powders must:

flow freely, including under the action of gravity alone, during transfers from one vessel to another or during the shaping of the fuel. This flowability is due to the crushing in the processes starting with powders. In the processes starting with nitrate solutions, it is obtained directly if a sol-gel process is used for the production of the intermediate oxide. In contrast, if simple coprecipitation is used, a simple breaking up of clumps or gentle crushing may be necessary;

retain properties, such that the shaping of the fuel and the sintering can be carried out under the conditions which are known at present.

Likewise, the finished fuel must obviously comply with the very strict specifications in force.

To solve the problem of completely dissolving (less than 0.5% of insoluble material) the sintered mixed oxide fuel material without employing expensive prior fine crushing or addition of hydrofluoric acid, different processes have been proposed which vary in the ease with which they may be carried out:

for example, a process described in French Pat. No. 2,419,924, starting with a nitrate mixture, consists in oxidizing the Pu in this solution to state VI, in precipitating a mixed carbonate in the presence of a solution of $(NH_4)_2CO_3$, $NH_3$ and $CO_2$, in filtering, thereby creating an effluent which requires processing, and in calcining and reducing the whole precipitate before the traditional shaping and sintering operations. This process is a variant of coprecipitation;

French Pat. No. 2,403,628 describes a process for handling powders with successive crushing, granulation and compacting stages before sintering, which has the disadvantages which are specifically due to the crushing stages;

French patent application No. 2,513,000 describes a process for pre-processing before dissolution for reprocessing the irradiated fuel, consisting in adding alkali metal salts or alkaline earth metal salts, and in heating to convert the oxides to uranates or plutonates and simultaneously to accomplish a pulverization of the fuel. Despite this, this process does not permit the complete dissolution of the Pu;

processes in a molten medium have also been described, using, for example, nitrate baths (BE 818,189).

SUBJECT OF THE INVENTION

The subject to the invention is a process for manufacturing mixed nuclear fuel based on sintered oxides, which enables fuel pellets to be obtained which are soluble, as they are, in nitric acid, thereby avoiding the use of hydrofluoric acid.

The subject of this process is also to eliminate wholly or partially the crushing operations which, in the prior art, can be necessary for complete dissolution of the pellets once they have been irradiated and cooled, or of the pellets scrapped during manufacture, or for making the powder mixtures homogeneous. It thus enables all risks of dangerous aerosol formation to be eliminated.

Its subject is also to eliminate the production of any effluent in the process, thereby making the process clean.

Another subject of the process is to obtain intermediate oxides which flow well.

Another subject is to obtain sintered shaped items or pellets which comply fully with the specification customarily required for the manufacture of nuclear fuels.

DESCRIPTION OF THE INVENTION

The process according to the invention, for the manufacture of mixed nuclear fuels based on a sintered mixture of uranium and at least one oxide of the elements of the group comprising Pu and Th, other fissile or fertile elements, rare earths including gadolinium, etc., but preferably of U and Pu, starting with solutions of nitrates of these elements, comprises:

(a) mixing the nitrate solutions in the desired proportions;

(b) concentrating this mixture solution by any means, under vacuum or otherwise, so as to remove the free water and, for example, to obtain uranyl nitrate in the hexahydrate form and plutonium nitrate, in which the plutonium can be in state IV and/or VI, in pentahydrate or hexahydrate forms, respectively;

(c) heat treatment to obtain an intermediate mixed oxide containing U in state VI and Pu in state VI and/or VI;

(d) where appropriate, calcining in the atmosphere at a temperature of at least 600° C., in cases where the mixed oxide obtained in (c) would be too reactive to be reduced directly, bringing, in particular, the uranium oxide to the state $U_3O_8$, and/or in cases where such a temperature would be necessary to convert a nitrate of an element in the mixture completely to oxide;

(e) reducing this oxide to bring the uranium and the plutonium to state IV;

(f) where appropriate, an operation for stabilization of the mixed oxide obtained;

(g) shaping and pressing the mixed oxide obtained, stabilized where appropriate, so as to obtain a so-called green item in any shape suited to the type of fuel element to be manufactured but preferably in the form of pellets;

(h) sintering in a reducing and/or gently oxidizing atmosphere at temperatures ranging from 700° C. to 1700° C., depending on the atmosphere chosen; and (i) grinding the items obtained, enabling the items to be brought to size and the possible defects of texture (cracks, etc.) to be revealed.

It is characterized in that, for the purpose of producing an intermediate oxide during stage (c) without the production of effluent and without the consequent need to operate a process for processing and disposal of this effluent, of producing a powder of intermediate mixed oxides in stages (c), (d), (e) and (f) of high flowability, of producing compact items which can be sintered under the known conditions of the prior art, of producing sintered compact items which are soluble, as they are, in nitric acid alone, that is to say without the need to perform crushing or any other prior treatment of the said irradiated items or the manufacturing scrap and using for this dissolution only nitric acid alone, without adding hydrofluoric acid, denitration is performed by heating to obtain directly, without the addition of an aid, an oxide, mixed or otherwise, having high reactivity and characterized by a large specific surface area, either directly from the concentrated solution obtained in (b) or after crystallization, by cooling this solution, in the form of solid particles.

Several variants of thermal denitration, all designed to obtain an intermediate oxide having high reactivity during stage (c), possessing the advantages and characteristics noted above, are possible:

a first variant, starting with the concentrated solution obtained in (b), consists in crystallizing it in a first stage, either in the form of solid particles by flaking or by any other cooling process, or in the form of spherical solid particles obtained, for example, by spraying the concentrated solution into a cooled inert fluid or by granulation on a support composed of the oxide itself or by any other means, and in treating these particles, in a second stage, by a thermal denitration process which gives directly, without the addition of an aid, an oxide of high reactivity having a large specific surface area, as described in French Pat. No. 2,536,737 which forms an integral part of the present description. This thermal denitration is mainly performed under a partial pressure of water vapour of less than 8.7 kPa (65 mm of Hg) so that, during the heating, to a temperature of at least 260° C., the latter always remains below the melting point of the said particles; it leads finally to an intermediate mixed oxide having a large specific surface area which proves capable of being sintered after the stages of calcining where appropriate, and of reduction, according to the known processes;

another variant, starting with the concentrated solution obtained in (b), is characterized in that the solution is treated directly by a two-stage thermal denitration process, giving directly, without the addition of an aid, oxides having a large specific surface area as described in French Pat. No. 2,526,006 which forms an integral part of the present description, wherein, mainly, the first stage is performed up to a temperature generally of between 160° C. and 260° C. to give a dehydrated solid and the second stage up to a temperature equal at most to 600° C.; the mixed oxide having a large specific surface area obtained is capable of being sintered after additional calcining where appropriate and reduction, according to the known processes. In some cases, in particular when the denitration of an element in the mixture is difficult, it is necessary, as noted above, to perform an additional calcining at a temperature above 600° C. in order to obtain an oxide which can be sintered. Such is the case, for example, for gadolinium, where it is necessary to heat to approximately 800° C.;. Another variant possessing, in addition to the advantages and characteristics noted above, that of eliminating the possible calcining envisaged in (d), which would have been intended exclusively to decrease the reactivity of the oxides, also starts with the concentrated solution obtained in (b), and is characterized in that the solution is treated by a thermal denitration process giving directly, without the addition of an aid, mixed oxides of predetermined reactivity, the latter being adjusted by the specific surface area as described in French patent application No. 2,555,566 corresponding to U.S. Pat. No. 4,687,601 which forms an integral part of the present description, the process being performed mainly in two stages, the first in order to dehydrate the solution (b) incompletely, the second in order to decompose the product derived from the first under controlled pressure of water vapour which, depending on its value, determines the reactivity obtained;

other variants possessing, in addition to the advantages noted above, that of eliminating wholly or partially the phases of removal of the nitrogen in the different processes of thermal denitration are characterized in that:

in cases where the denitration is performed according to the process described in French Pat. No. 2,536,737, performed starting with solid nitrates, the process is stopped as soon as an infusible product has been obtained and the reduction envisaged in stage (e) is performed directly on the dehydrated infusible solid product obtained at the end of the first stage;

in cases where the denitration is performed according to the process described in French patent application No. 2,555,566, performed starting with nitrates in solution, the reduction envisaged in stage (e) of the partially dehydrated solid obtained at the end of the first stage is performed directly.

The mixed oxide powders obtained in (c) are perfectly freely flowing. However, in some cases, if the flowability was insufficient, it would be necessary to provide for a non-contaminant breaking up of clumps, which would enable the result to be achieved without having the disadvantages of fine crushing.

The pure solutions of uranium nitrate or plutonium nitrate, or of the nitrate of any other element used for making the mixture (a) can be obtained by various means. In particular, the solution of uranile nitrate can contain uranium originating from only one or from several of the following sources:
natural uranium,
non-irradiated enriched uranium,
non-irradiated depleted uranium,
irradiated enriched uranium (from reprocessing),
irradiated depleted uranium (from reprocessing).

In cases where enriched uranium is used, it can be derived from traditional enrichment plants where it is customarily obtained in the form of pure $UF_6$, and it then undergoes a series of known chemical conversions designed to bring to the form of solutions, for example, successively, hydrolysis, reduction, calcining and dissolution. In cases of laser enrichment, the enriched uranium is obtained in the form of impure metal which is then dissolved in nitric acid, in the presence or absence of an oxidizing agent such as air, oxygen, hydrogen peroxide, etc., which is purified by known means such as backwash-extraction with tributyl phosphate solvent, to obtain a uranile nitrate solution capable of being used directly for the production of the mixtures of stage (a). Before dissolution, the metal can also be oxidized by any suitable means, such as air or oxygen, so as to reduce the consumption of nitric acid or the emission of nitrous vapours during the dissolution.

The denitration operation is performed with emission of water vapour and nitrous vapours $NO_x$. According to an improvement of the present process, these nitrous vapours can be trapped, oxidized with air, oxygen, hydrogen peroxide or any other oxidizing agent, and then condensed so as to recover the nitric acid, which can be recycled directly or after concentration and without further treatment, for example for the dissolution operations.

The process according to the invention is preferably applied to U+Pu mixtures, it being possible for the ratio by weight Pu/(U+Pu) to reach 0.4, but also to combinations with rare earth metals, in particular cerium and gadolinium. It is also applied to the production of fuels containing uranium alone.

The Applicants have found that, surprisingly, the operations of reduction, of shaping by pressing and of sintering performed using these intermediate mixed oxides, obtained directly by one of the so-called high reactivity denitration processes, can be performed under working conditions identical to those used with intermediate mixed oxides derived from processes of the coprecipitation or powder mixture type, although the oxides from high reactivity denitration possess different physical properties. It has also found that the amount of binder added for the sintering could be considerably reduced.

The process according to the invention thus leads to sintered oxide fuel items, usually pellets, which are directly soluble in nitric acid alone, without prior crushing and without the addition of hydrofluoric acid, regardless of whether or not these pellets have undergone irradiation. The recycling of manufacturing scrap, and likewise the dissolution of cooled spent fuels for the purpose of reprocessing, are thus carried out under much simpler and safer conditions, since very fine crushing is no longer necessary.

The prorduct also satisfies very amply the requirements in respect of the rate of dissolution stated by the specialists; it is of the same order of magnitude as that obtained with uranium alone. The same applies to the dissolution yield, which is very high since it exceeds 99.9%. These exceptional results are due to the fact that the solid $UO_2+PuO_2$ solution obtained through the effect of the sintering temperature is very good, as a result of the extremely intimate mixing of the different constituent elements, which is not destroyed by the denitration.

In coprecipitation, the constituents do not all precipitate under identical conditions, and this partially destroys this homogeneity obtained during liquid phase mixing and on denitration.

Thus, the homogeneity of the sintered mixed oxide is virtually perfect, since not only does it comply with the specification (no particle of $PuO_2$ exceeds a diameter of 400 μm measured by α- autoradiography and the mean diameter is less than 100 μm), but also no plutonium-bearing particle is detected either by α-autoradiography, X-rays or microprobe analyser.

Similarly, all the other properties demanded for the fuel are much more amply satisfied, in particular, higher densities, dimensional stability, perfect homogeneity, improved texture (absence of cracks, etc.), porosity and particle size.

EXAMPLES

Example 1

In this example, the $Pu(NO_3)_4$ solution was first prepared by concentrating by distillation 1000 cm$^3$ of a solution of 1.25 normal with respect to nitric acid and containing 21.95 g of Pu, to bring it to a volume of 330 cm$^3$.

726.8 g of uranile nitrate hexahydrate were then added to obtain a nitrate mixture in solution in which the ratio (Pu/U+Pu)=0.06.

The mixed solution obtained was concentrated at up to approximately 140° C.

This solution was then crystallized by flaking, cooling it to minus 95° C. 744 g of solid product were obtained.

This product was then dehydrated and denitrated according to the process described in Patent FR No. 2,535,737, heating under a total reduced pressure of less than 0.13 kPa (1 mm of mercury) and maintaining the temperature of the product during the temperature rise always below its melting point:
rate of temperature rise obtained: 250° C./h.
maximum temperature reached: 400° C.

The specific surface area of the intermediate oxide obtained is 40 m$^2$/g.

The calcining of this product was carried out for 1 h at 600° C. and followed by the breaking up of clumps by hand, the product then passing a 125 μm sieve.

The reduction was carried out at 600° C. for 1 h with hydrogen diluted to 5% in argon.

The stabilization was carried out at 40° C. with an argon/air mixture:

10 min with an argon/air ratio = 5:1
20 min with an argon/air ratio = 2:1
40 min with an argon/air ratio = 1:1 and was followed by cooling under vacuum.

The pelletizing was carried out with a floating-die hydraulic press by direct pressure after adding 0.7% of Zn stearate.

3 tests were carried out: at 3.5 t/cm$^2$, 4.5 t/cm$^2$ and 5.5 t/cm$^2$.

The sintering was carried out in a reducing atmosphere (Ar/H$_2$ mixture containing 5% of hydrogen) according to the following heating scheme:
150° C./h up to 900° C.
300° C./h up to 1640° C., followed by a 6 h plateau period.

By way of experiment, a second 6 h plateau period at 1740° C. was applied.

The following results were obtained:

| Test | Pelletizing pressure t/cm$^2$ | Densities (as % of the theoretical density) | | |
|---|---|---|---|---|
| | | Green | Sintered | Plateau at 1640° C. | Plateau at 1740° C. |
| 1 | 3.5 | 45.5 | 94.4 | 94.7 | 94.6 |
| 2 | 4.5 | 49.0 | 95.0 | 94.8 | 94.6 |
| 3 | 5.5 | 51.7 | 93.2 | 93.3 | 93.3 |

It is seen that the densities are acquired as soon as the product is sintered, and that maintenance at a temperature plateau is unnecessary. The densities comply with the specifications.

The yields of dissolution in 14N nitric acid at 100° C. for 6 h are excellent:
99.94% for the sintered product of test (3)
99.99% for the product resintered at 1740° C. of test (2)
99.96% for the sintered product of test (1).

Autoradiography, while detecting a slight heterogeneity of the distribution of Pu, nevertheless shows that the product satisfies the specifications, and the heterogeneity has no influence on the rate or yield of dissolution.

Example 2

The starting substances and the process followed in this example were the same as in Example 1. It differs therefrom mainly in that the breaking up of clumps is omitted and, in addition, some parameters were slightly modified.

In the denitration, the rate of temperature rise obtained was 250° C./h and the temperature reached was 380° C. The reduced pressure was identical.

The calcining was performed at 525° C. for 1 h. The breaking up of clumps was omitted.

The reduction and the stabilization were identical.

At this stage, the whole product was passed through a 1.6 mm sieve.

The pressing was performed with 0.4% of Zn stearate with a pressure of 5 t/cm$^2$.

The sintering was followed by a 6 h plateau period at 1640° C.

The green density obtained was 44.9% of the theoretical density.

The sintered density obtained was 93.9% of the theoretical density.

The omission of the breaking up of clumps had only a slight effect.

Example 3

In this example, the starting solutions were the same as in Example 1. The calcining was omitted.

The concentration was stopped at 120° C.

The crystallization by flaking was performed at 40° C.

The denitration was performed under vacuum according to the working conditions of Example 1, and stopped at 420° C.

This product was subjected directly to reduction under an atmosphere of a mixture of argon containing 5% of hydrogen, at a temperature of 700° C.

The stabilization was carried out at 40° C. as in Example 1. At this stage, the product was passed through a 1 mm sieve.

The pelletizing was carried out under a pressure of 5.8 t/cm$^2$.

The sintering was continued until a 6 h plateau period was obtained at 1600° C. under an Ar, 5% H$_2$ atmosphere.

The green density obtained was 50.5% of the theoretical density.

The sintered density obtained was 96.3% of the theoretical density.

The dissolution yield in hot (100°) nitric acid for 6 h was still very high: 99.94%.

Example 4

In this example, the starting solution was obtained according to a process identical to that of Example 1, but with a Pu/(U+Pu) ratio equal to 0.25 and the omission of the breaking up of clumps.

The concentration was stopped at 140° C.

The crystallization by flaking was performed at 80° C.

The denitration was performed as in Example 3, stopping at 420° C. to obtain a solid intermediate product which was directly subjected to reduction in an Ar, 5% H$_2$ atmosphere at 700° C.

The stabilization was carried out as in Example 1 at 40° C.

At this stage, the product was passed through a 1.5 mm sieve.

The pelletizing was identical to that of Example 3 (5.8 t/cm$^2$).

The sintering was also identical to that of Example 3.

The green density was obtained was 50.8% of the theoretical density.

The sintered density obtained was 93.6% of the theoretical density.

The dissolution yield in hot (100° C.) 14N nitric acid for 6 h was still very high: 99.93%.

Example 5

In this example, a process identical to that of Test 1 was used, but starting with a solution containing only uranium.

The starting solution was obtained by distilling 840 cm$^3$ of 1.25N nitric acid solution (quantity of acid which corresponds to the Pu solution of Example 1) to bring it to a volume of 330 cm$^3$. 610.5 g of uranile nitrate hexahydrate were then added to it.

The concentration was stopped at 128° C.

The crystallization by flaking was performed at 105° C., obtaining 665 g of product.

The latter was then subject to dehydration/denitration according to the same protocol as in Example 1, in particular:

no melting of the product
reduced pressure of 0.13 kPa (1 mm of mercury)
rate of temperature rise: 250° C./h
maximum temperature reached: 400° C.

The specific surface area obtained is 32 m²/g.

The calcining, reduction and stabilization were performed under the same conditions as in Example 1.

The pelletizing was also performed under the same conditions, the pressures used being 3.5 t/cm² and 4.5 t/cm².

The sintering was also carried out under the same conditions with, in particular, 6 h plateau periods at 1640° C. and 1740° C.

The results obtained are as follows:

| Test | Pelletizing pressure t/cm² | Density (as % of the theoretical density) | | |
|---|---|---|---|---|
| | | Green | Sintered Plateau at 1640° C. | Plateau at 1740° C. |
| 4 | 3.5 | 49.4 | 93.9 | 95.2 | 95.8 |
| 5 | 4.5 | 52.1 | 95.3 | 95.2 | 95.8 |

The densities comply with the specifications and are of the same order of magnitude as in the case of the U/Pu mixtures.

Example 6

This example may serve as a reference example, since it consisted in producing a fuel containing uranium alone according to a customary process of the prior art.

The starting substance was $UF_6$, which was first hydrolysed; the product obtained was then reduced with hydrogen to give a $UO_2$ powder which was then stabilized and then treated according to the process of Example 1 (or 5).

The pelletizing was performed at 2.5 t/cm², 3.5 t/cm² and 5.0 t/cm².

The sintering was performed under an Ar, 5% $H_2$ atmosphere with a 6 h plateau period at 1640° C.

The results obtained are as follows:

| Test | Pelletizing pressure t/cm² | Density (as % of the theoretical density) | |
|---|---|---|---|
| | | Green | Plateau at 1640° C. |
| 6 | 2.5 | 42.2 | 94.7 |
| 7 | 3.5 | 48.5 | 95.3 |
| 8 | 5 | 54.4 | 95.7 |

The results of Examples 5 and 6 relating to uranium alone, one of them treated according to the process of the invention and the other according to an accepted process of the prior art, are in complete agreement.

We claim:

1. A process for producing sintered mixed metal oxide nuclear fuel pellets containing $UO_2$ and the oxide of at least one other fissile or fertile or rare earth element M, said pellets being directly soluble in nitric acid without nitric acid additives or prior treatment of the pellets, comprising the steps of:
   (a) mixing together aqueous solutions of uranium nitrate and the nitrate of said at least one other element M;
   (b) concentrating the mixture of solutions;
   (c) thermally denitrating said concentrated mixture, without additives, to obtain an at least partially denitrated intermediate mixed oxide powder of high reactivity, with the uranium in valence VI;
   (d) optionally calcining said intermediate mixed oxide powder to the extent necessary to convert uranium oxide to $U_3O_8$ and to complete the conversion of difficult to decompose nitrates into oxides;
   (e) directly reducing, without grinding, the resulting mixed oxide powder to bring the uranium to valence IV;
   (f) optionally stabilizing the uranium oxide $UO_2$ in the reduced oxide mixture;
   (g) shaping and pressing the resulting reduced oxide mixture to obtain pellets of green material suitable for manufacturing the mixed oxide fuel;
   (h) sintering said pellets of green material at high or low temperature in a reducing and/or gently oxidizing atmosphere;
   (i) grinding said sintered pellets,
   said process providing as a result of steps (c), (d), (e) and (f) mixed oxide powders of high flowability and good sinterability without crushing, whereby no troublesome effluent or dangerous aerosol of solids is produced as a result of crushing.

2. Process according to claim 1, wherein said fissile or fertile or rare earth element is Pu, Gd or Th.

3. Process according to claim 1, wherein said concentrated mixture of solutions is cooled to obtain solid particles of nitrates, and wherein said thermally denitrating step (c) comprises heating said particles under an atmosphere comprising a partial pressure of water vapor less than 8.7 kPa (65 mm of mercury) to a temperature of at least 260° C., the temperature of the solid particles remaining at all times below their melting point.

4. Process according to claim 3, wherein said solid particles of nitrates are spherical solid particles.

5. Process according to claim 4, wherein said spherical solid particles are obtained by spraying said concentrated mixture into a cooled inert fluid.

6. Process according to claim 4, wherein said spherical solid particles are obtained by granulation of said concentrated mixture on an intermediate mixed oxide support.

7. Process according to claim 1, wherein said thermal denitration is performed by directly heating said concentrated mixture in liquid form in two stages:
   (a) heating said liquid to a temperature of between 160° and 260° C. to give a dehydrated solid; and
   (b) heating the dehydrated solid up to a temperature up to about 600° C.

8. Process according to claim 1, wherein said thermal denitration is performed by directly heating said concentrated mixture in liquid form in two stages:
   (a) incompletely dehydrating said liquid; and
   (b) decomposing the resulting incompletely dehydrated liquid under controlled pressure of water vapor which determines the reactivity obtained, whereby subsequent calcining can be minimized.

9. Process according to claim 1, 2, 3, 7 or 8, wherein said reduction is performed directly on a solid infusible intermediate product obtained during denitration.

10. Process according to claim 1, 2, 3, 7 or 8, wherein said fissile or fertile or rare earth element is cerium.

11. Process according to claim 1, 2, 3, 7 or 8, wherein said aqueous solutions consist essentially of uranium nitrate.

12. Process according to claim 1, 2, 3, 7 or 8, wherein the uranium in said uranium nitrate solution is natural uranium, non-reprocessed enriched uranium, non-reprocessed depleted uranium reprocessed enriched uranium, depleted uranium, or mixtures thereof.

13. Process according to claim 1, 2, 3, 7 or 8, wherein the uranium in said aqueous solutions of uranium nitrate originates from a laser enrichment cycle.

14. Process according to claim 1, 2, 3, 7 or 8, wherein the uranium present in said aqueous solution of uranium nitrate originates from a laser enrichment cycle leading to uranium in impure metallic form which is dissolved in nitric acid and purified to yield a uranyl nitrate solution.

15. Process according to claim 1, 2, 3, 7 or 8, wherein said fissile or fertile or rare earth element is plutonium, and said step (b) of concentrating the mixture of solutions is performed until said concentrated mixture of solutions comprises:
   (a) uranyl nitrate hexahydrate; and
   (b) plutonium (IV) nitrate pentahydrate, plutonium (VI) nitrate hexahydrate, or a mixture thereof.

16. Process according to claim 1, additionally comprising dissolving said sintered, ground pellets directly in nitric acid without additives.

* * * * *